(12) United States Patent
Härtel et al.

(10) Patent No.: US 6,516,913 B1
(45) Date of Patent: Feb. 11, 2003

(54) AXLE SUPPORT FOR MOTOR VEHICLES

(75) Inventors: Wulf Härtel, Detmold (DE); Markus Scherp, Diemelstadt (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/724,262

(22) Filed: Nov. 28, 2000

(30) Foreign Application Priority Data

Dec. 11, 1999 (DE) .......................................... 199 59 814

(51) Int. Cl.$^7$ .............................................. B60K 17/00
(52) U.S. Cl. ........................ 180/312; 180/377; 280/781
(58) Field of Search ................................ 180/312, 311, 180/377, 378; 280/781, 784, 788, 796, 124.109; 296/204, 205

(56) References Cited

U.S. PATENT DOCUMENTS

| | | | | | |
|---|---|---|---|---|---|
| 3,909,058 | A | * | 9/1975 | Kramer et al. ............... | 296/189 |
| 4,989,665 | A | * | 2/1991 | Yamagiwa et al. .......... | 180/311 |
| 5,611,568 | A | * | 3/1997 | Masuda ....................... | 280/784 |
| 5,862,877 | A | * | 1/1999 | Horton et al. ............... | 180/312 |
| 5,884,722 | A | * | 3/1999 | Durand et al. ............... | 180/312 |
| 6,135,542 | A | * | 10/2000 | Emmelmann et al. ...... | 296/205 |
| 6,233,826 | B1 | * | 5/2001 | Wycech ....................... | 29/897.1 |

FOREIGN PATENT DOCUMENTS

| | | | |
|---|---|---|---|
| DE | 298 09 241 U1 | | 8/1998 |
| JP | 5-278049 | * | 10/1993 |

* cited by examiner

*Primary Examiner*—Peter C. English
(74) *Attorney, Agent, or Firm*—Friedrich Kueffner

(57) ABSTRACT

An axle support for motor vehicles has a U-shaped hollow frame with a transverse tube, a first curved transition portion connected to a first end of the transverse tube, and a second curved transition portion connected to a second end of the transverse tube, a first longitudinal tube connected to the first transition portion, and a second longitudinal tube connected to the second transition portion, wherein the first and second longitudinal tubes extend perpendicularly to the transverse tube in the same direction away from the transverse tube. The first and second longitudinal portions each have a curved section with a depression. The curved sections have an interior filled with an inner foamed member of hardenable foam.

13 Claims, 1 Drawing Sheet

AXLE SUPPORT FOR MOTOR VEHICLES

BACKGROUND OF TEE INVENTION

1. Field of the Invention

The invention relates to an axle support for a motor vehicle in the form of a U-shaped frame of hollow construction, which comprises a transverse tube and longitudinal tubes connected to the transverse tube by curved transition portions and extending substantially perpendicularly to the transverse tube.

2. Description of the Related Art

Single-part or multi-part axle supports formed of a tube by the method of hydroforming as well as axle supports of pressed shell construction require bends or arc-shaped curved portions in order to provide the axle support with a shape corresponding to the respective mounting situation. However, the deformation processes cause a reduction of the wall thickness, in particular, in the areas of the bends or curved portions. These areas of wall thickness reduction can cause a reduction of the fatigue strength and the buckle-proof properties (buckle resistance).

From the disclosure of German patent document DE 298 09 241 U1 a twist beam axle is known having a straight transverse support with a V-shaped or U-shaped torsion section and having substantially circular or oval tubular end portions. For reinforcement of the straight transition portions from the torsion section to the end portions, the end portions are provided partially with an inner foamed member of a multi-component plastic foam. These twist beam axles have been used successfully in practice.

SUMMARY OF THE INVENTION

It is an object of the present invention to improve an axle support with respect to vibration-technological aspects as well as with respect to the fatigue strength and the buckle-proof properties.

In accordance with the present invention, this is achieved in that each longitudinal tube has a curved section provided with a depression and filled with an inner foamed member of a hardenable (curable) foam.

According to the invention, hydroformed curved steel or aluminum frames can be used. It is also possible to employ frames of a pressed shell configuration in the context of the present invention. A frame comprises a transverse tube and longitudinal tubes connected by curved transition portions to the transverse tube and extending substantially perpendicularly to the transverse tube. The longitudinal tubes have a curved section, when viewed in the mounted state of the axle support, which extends downwardly from the transverse tube. When the axle support is mounted in the motor vehicle, the drive train extends above the curved section. The frame is stiffened by an inner foamed member of a hardenable foam in the curved section of the longitudinal tubes.

With this measure, the curved sections of the longitudinal tubes, weakened as a result of the deformation process, are reinforced in a directed way. The foam material effects an increase of the fatigue strength and buckle-proof properties in a crash situation. Also, the foamed material has a positive effect on the vibration behavior of the axle support.

Preferably, the transition portions of the frame are also provided with inner foamed members. Moreover, the entire frame can be completely filled with a foamed member.

The foamed members are preferably made of single-component or multi-component foams. Polyurethane foams are two-component systems with a polyol component and an isocyanate component. Especially preferred is a polyurethane foam with a density between 0.07 and 0.7 kg/l. Epoxide-based foams can be used in the form of single-component or two-component systems. In the first case, foam parts of a shape that is already defined are introduced during manufacture into the frame and foam and harden in the frame at certain temperatures. The two-component systems relate to injection foams which are combined in liquid form in a mixing head with a mixing cartridge and which are introduced either manually or robot-controlled into the frame. Preferably, an epoxide foam is used having a density between 0.5 and 0.9 kg/l, in particular, 0.65 to 0.75 kg/l.

Possible is also the use of aluminum foam of a density between 0.5 and 0.9 kg/l, in particular, 0.65 to 0.75 kg/l. The use of aluminum foam is, in particular, useful in the context of a frame made of aluminum or an aluminum alloy.

Depending on the type of the axle support and the mounting situation, the foam density can be adjusted according to the required energy absorption capacity.

The foam material increases the buckle-proof properties in the area of the designated buckling zone determined by the construction of the frame. The foam material provides a support of the inner tube wall and thus results in an increase of the energy absorption capacity and the buckling resistance. In this way, buckling of the frame is counteracted.

The foam material also results in a reinforcement of the wall thickness which has been weakened by the hydroforming or bending processes. By this measure, possible damage, such as crack formation resulting during permanent load, can be counteracted or prevented.

The directed foamed member placement may also enable a wall thickness reduction in areas that are loaded to a lesser degree.

Moreover, the axle support according to the invention also has an excellent vibration behavior because the partial introduction of the foam material results in an increase of damping action of the frame. Free vibrations of the axle support are dampened by the foam material. Critical vibration ranges during operation are thus avoided.

DESCRIPTION OF THE PREFERRED EMBODIMENTS

Figure 1:
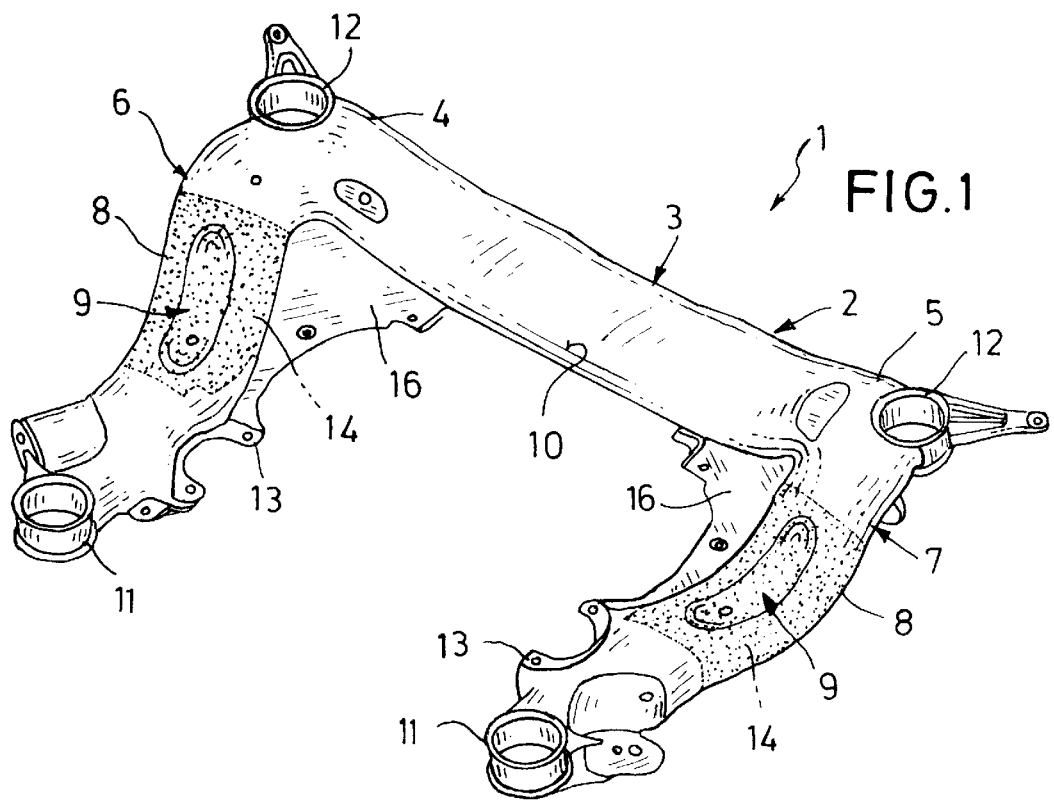
FIG. 1 is a perspective view of a first embodiment of an axle support according to the present invention.
Figure 2:
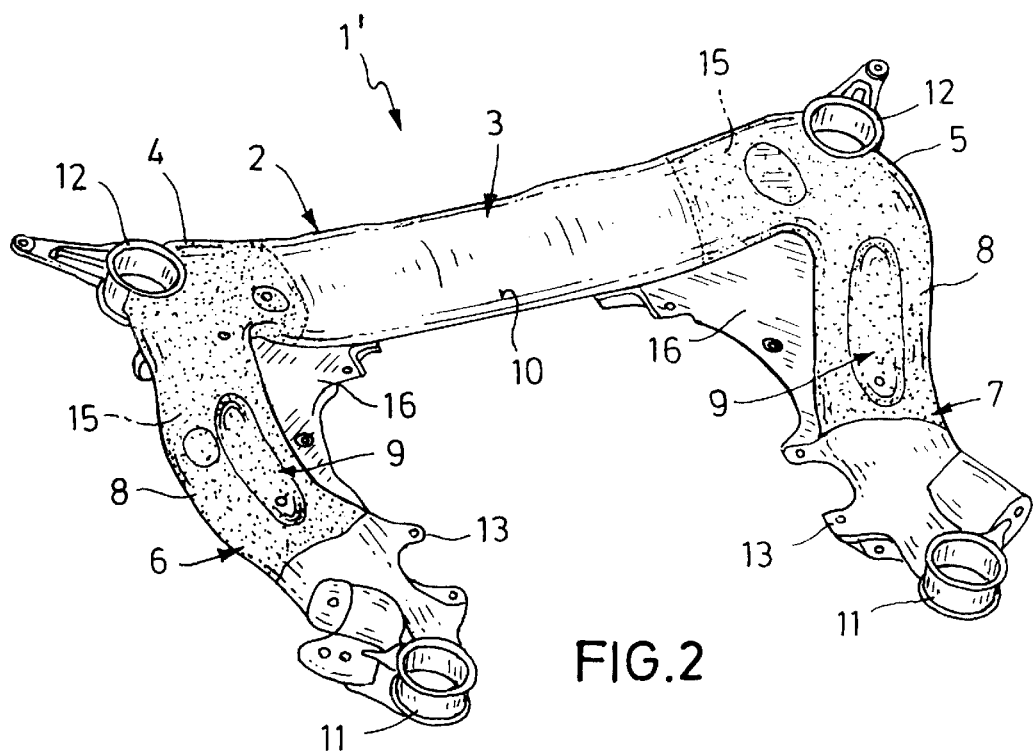
FIG. 2 is a perspective view of a second embodiment of an axle support according to the present invention.

The FIGS. 1 and 2 show in a perspective view an axle support 1 or 1' for a motor vehicle, respectively. The axle supports 1 and 1' correspond to one another with respect to their configuration. Accordingly, the basic configuration for both embodiments is described in the following.

The axle support 1, 1' comprises a U-shaped hollow frame 2 with a transverse tube 3 and longitudinal tubes 6, 7 positioned substantially perpendicularly to the transverse tube 3 and connected thereto by curved transition portions 4, 5. The longitudinal tubes 6, 7 each have a curved section 8 which is downwardly curved with respect to the plane of the illustration and has a depression 9. When mounted in a motor vehicle, the drive train is arranged above the curved sections 8 or the depressions 9.

One can also see that the transverse tube 3 has a reduced cross-section by means of a flattened portion 10 at the inwardly positioned side of the frame 2 in the central area. Reference numerals 11 and 12 are bearing receptacles for the axle support 1, 1'. The transmission support is identified by reference numeral 13.

In the axle support 1, the curved sections 8 are reinforced by the partially provided inner all-over foamed member 14 arranged in the hollow interior of the axle support 1.

The axle support 1' has a foamed member 15 which extends in the hollow interior of the axle support 1' from the curved sections 8 through the transition portions 4, 5 into the transverse tube 3.

The wall thickness of the frame 2 can vary between 1 mm and 2.8 mm. Conventional in this connection are at present wall thicknesses between 1.9 to 2.5 mm. The material for the frame 2, in addition to conventionally used steel qualities, can be also stainless steel or aluminum or an aluminum alloy.

The foamed member 14, 15 is comprised of a hardenable foam. In practice, the use of polyurethane foam having a density of between 0.07 and 0.7 kg/l or an epoxide foam having a density of approximately 0.7 kg/l is suitable. Moreover, the use of aluminum foams having a density of approximately 0.7 kg/l promises to provide improvements with respect to the chassis.

The foamed members 14 or 15 increase the buckle-proof behavior (buckle resistance) in the area of the curved sections 8, deformed as a result of the configuration requirements, together with their recessed depressions 9 and the transition portions 4, 5. The wall thickness, weakened as a result of the deformation process (hydroforming or bending) in the area of the curved sections 8 or the transition portions 4, 5 are reinforced from the inside. This support increases the energy absorption and the buckle resistance is increased. Moreover, the vibration behavior of the axle support 1, 1' is positively affected because the partial introduction of the foamed member 14, 15 increases the damping action of the frame 2.

The transition portions 4, 5 are additionally reinforced by a sheet metal stay (gusset) 16 in the area between the transverse tube 3 and the longitudinal pipe 6 and 7, respectively.

While specific embodiments of the invention have been shown and described in detail to illustrate the inventive principles, it will be understood that the invention may be embodied otherwise without departing from such principles.

What is claimed is:

1. An axle support for motor vehicles, the axle support comprising:

a U-shaped hollow frame comprising a transverse tube, a first curved transition portion connected to a first end of the transverse tube and a second curved transition portion connected to a second end of the transverse tube, a first longitudinal tube connected to the first transition portion and a second longitudinal tube connected to the second transition portion, wherein the first and second longitudinal tubes extend perpendicularly to the transverse tube in a same direction away from the transverse tube;

wherein the first and second longitudinal tubes each have a curved section with a depression; and wherein each of the curved sections has an interior filled with an inner foamed member of hardenable foam.

2. The axle support according to claim 1., wherein the inner foamed members extend into the first and second transition portions, respectively.

3. The axle support according to claim 1, wherein the inner foamed members are comprised of a polyurethane foam having a density of between 0.07 and 0.7 kg/l.

4. The axle support according to claim 1, wherein the inner foamed members are comprised of an epoxide foam having a density of between 0.5 and 0.9 kg/l.

5. The axle support according to claim 4, wherein the inner foamed members are comprised of an epoxide foam having a density of 0.65 to 0.75 kg/l.

6. The axle support according to claim 1, wherein the inner foamed members are comprised of an aluminum foam having a density of between 0.5 and 0.9 kg/l.

7. The axle support according to claim 6, wherein the inner foamed members are comprised of an aluminum foam having a density of 0.65 to 0.75 kg/l.

8. The axle support according to claim 1, wherein the frame has a wall thickness of between 1.00 mm to 2.80 mm.

9. The axle support according to claim 8, wherein the frame has a wall thickness of 1.90 mm to 2.50 mm.

10. The axle support according to claim 1, wherein the frame is comprised of steel.

11. The axle support according to claim 1, wherein the frame is comprised of stainless steel.

12. The axle support according to claim 1, wherein the frame is comprised of aluminum.

13. The axle support according to claim 1, wherein each one of the transition portions has a gusset in the form of a sheet metal stay connecting the transverse tube and the first and second longitudinal tubes, respectively.

* * * * *